Feb. 3, 1959  O. E. A. ASPEGREN  2,872,386

HEAT-TREATMENT OF PIECE-SHAPED MATERIAL

Filed April 14, 1952

INVENTOR.
OLOF E. A. ASPEGREN
BY
*Gulwider Mattingly & Huntly*
ATTORNEYS

United States Patent Office 2,872,386
Patented Feb. 3, 1959

2,872,386
HEAT-TREATMENT OF PIECE-SHAPED MATERIAL

Olof Erik August Aspegren, Stockholm, Sweden, assignor to The Oil Shale Corporation, Beverly Hills, Calif., a corporation of Nevada Application April 14, 1952, Serial No. 282,159
1 Claim. (Cl. 202—136)

The present invention relates to improvments in treatment, such as drying, heating, dry-distillation or pyrolysis of piece-shaped material of different kind by means of heated or cooled loose bodies, which are brought into direct contact with the material to be treated during the rotation of the drum.

This application is a continuation-in-part of my copending application No. 662,890 filed April 17, 1946, which has since issued as U. S. Patent No. 2,592,783.

The present invention is concerned with a process which comprises heating a material in a first rotating furnace by means of loose heat-carrying bodies and wherein said heat-carrying bodies are first heated in a second rotating furnace by combustion of fuel in admixture therewith, the heat-carrying bodies circulating through both furnaces. The invention also includes a plant for carrying said process into practice.

The invention will be described more fully in connection with the attached drawings, wherein.

Figure 1:
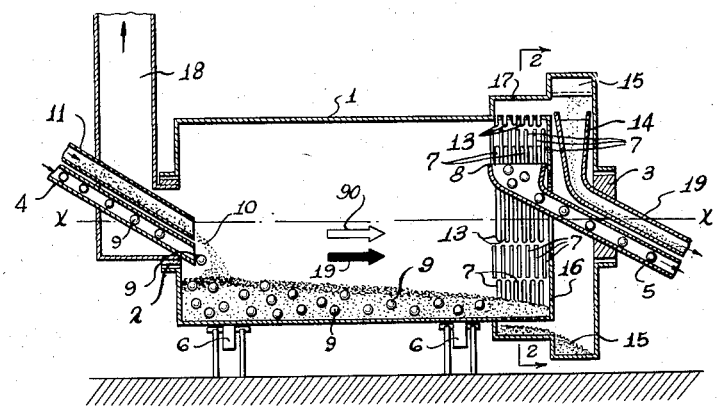
Fig. 1 shows an axial sectional elevation through a rotatable drum showing the material to be treated and heat carrying bodies in coincident flows through the drum.

In Figure 1, 1 designates a cylindrical drum for heat treatment, rotatable upon the roller supports 6, around the horizontal axis $x$—$x$; furthermore, 2 and 3 designates centrally arranged, stationary parts of the drum and walls, said parts forming supports for inlet and outlet conduits for material and heat carrying bodies, and for other communications with the inside of the drum.

In Fig. 1 it is illustrated how the heat carrying bodies, in this case and throughout supposed to have the shape of balls, are separated from the material to be treated. Balls 9 are charged into the drum through the inlet conduit 4, and due to the rotation of the drum the balls are there mixed with the material to be treated 10. Secured to the inside circumference of the drum are one or more screens 7, which screens have openings of such a size that fine-grained material in the drum can pass through while balls in the way of a screen will be caught and shoved before the screen. Each of said screens has such an inclination or shape that the balls cannot roll off before the screen has reached, due to the rotation of the drum, a certain point in the upper half of the drum. Beginning to roll off at said point the balls fall into a funnel 8 and are discharged through the outlet conduit 5.

Figure 2:
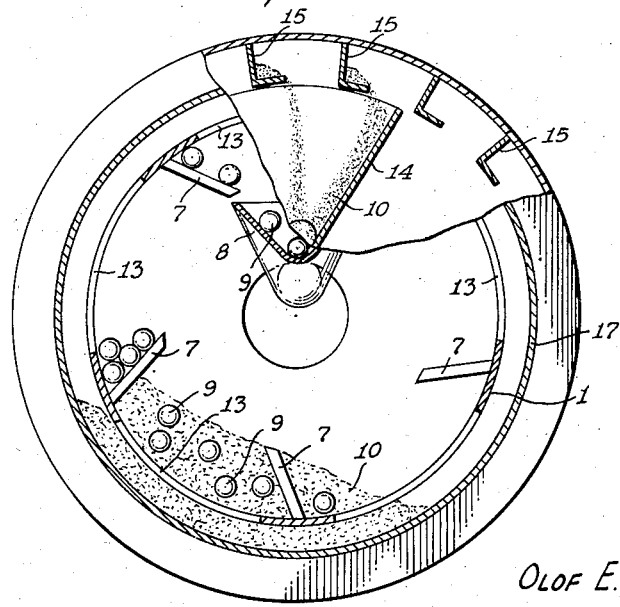
Fig. 2 is a cross-section along the line 2—2 of Fig. 1, having a portion of the drum broken away.

In Figs. 1 and 2 it is also illustrated how the material to be treated, said material supposed to be more or less fine-grained, is discharged from the drum. The material 10 is charged to the drum through the inlet conduit 11, and, due to the rotation of the drum, the material is there being mixed with the heat carrying ball-shaped bodies. In the circumference of the drum are screen openings 13 having a size that allows the fine-grained material but not the balls to slip through.

The material that slips through is being collected in a widened section of the drum 17 from which it is passing on into pockets located in a more widened section of the drum 15. Said pockets are so shaped that the material caught in one is being lifted, and cannot pour out before the pocket has reached a certain point in the upper half of the drum at which point the material begins to pour out, and falls into a funnel 14, and is discharged through the outlet conduit 12.

In Fig. 1, 18 is an outlet conduit for steam or gas, developing during the heat treatment process, the filled arrowsign 19 the direction of material flow, and the open arrowsign 20 the direction of flow of heat carrying bodies.

Fig. 1 makes it clear in what way inlet and outlet conduits for material and heat carrying bodies can be applied centrally in the end walls of the drum, adjacent to the rotary axis $x$—$x$, and, furthermore, that the invention can be applicable to rotatable heat treatment drums in which material and heat body flows are coincident.

The screen openings are located at the circumference of the cylinder-mantle. Said screen openings could instead be located peripherally in the inner end wall 16, in which case the widened section 17 of the drum would not be necessary. The only purpose of said inner end wall 16 is to prevent heat carrying bodies to flow over into the pockets 15 for material to be discharged.

Experiments have testified that the mixture and the flow of material and heat carrying bodies through the heat treatment section of the rotating drum can be controlled on the basis of a certain length of said treatment section in relation to the diameter of the drum, and, therefore, that the dimensioning of the drum is an important factor for the result of the heat treatment process.

If, in the case of coincident flows of material and bodies, the length of the drum is too large, the materials in the drum will have a tendency to part, and the heat carrying bodies, especially ball-shaped ones, to run ahead of the material by counter-current flows there will be a tendency of blocking. On the other hand a certain length of the drum is necessary for the development of the process.

The above-mentioned experiments have manifested that in each special case a certain length of the drum can be determined in relation to the gravitation of the materials in the drum, and that such a determination is important to the heat treatment process.

Generally, it is understood that as my invention is intended for use in various connections the elements shown in the drawings may have equivalents substituted therefor, and that such changes as are necessary for adapting my invention to its various requirements without departing from the spirit of the invention may be made and fall within the scope of the appended claim.

I claim:

A device for the treatment of piece-shaped material by means of balls which are brought into direct contact with the material during its operation; said device comprising a cylindrical drum rotating about a generally horizontal axis; an annular end wall defining a central opening at each of the opposite ends of said drum; means for supporting said drum for rotation; a stationary inlet conduit for the balls extending into said drum through the first of said end walls; an upwardly open stationary outlet conduit for the balls extending out of said drum through the other of said end walls; a stationary inlet conduit for the material extending into said drum through the first of said end walls; at least one grate-like catching member secured to and projecting inwardly from the inner surface of the side wall of said drum adjacent the other of said end walls of said drum, the openings of said catching member having such size in relation to the size of the balls and the size of the pieces of material that when said catching member during rotation of said drum is moved through the balls and material, the balls are prevented from passing through said openings while the material passes freely through said openings, said catching members being inclined away from the radial in a direction to prevent the balls from rolling off until the grating members have rotated to a predetermined height above the lowest point of rotation so that during the rotation of the latter the balls are first lifted and then discharged from the catching member into said upwardly open outlet conduit when said catching member is disposed substantially above the latter; a transverse partition wall arranged in said drum adjacent to and spaced from the other of said end walls, the side wall of said drum between said partition and the adjacent end wall having a diameter larger than the remainder thereof; an upwardly open outlet conduit for the material extending out of the section of the drum between said partition and said adjacent end wall and through said other end wall; an outer shell of a diameter less than that of said large diameter portion of the side wall extending around and spaced from said side wall of the drum and opening endwise through said partition into said section of the drum between said partition and said adjacent end wall, openings in said side wall communicating radially with the space enclosed by said outer shell for passing material into said space, and pocket forming members between said partition and said adjacent end wall secured to the side wall for raising material passed through said openings into said space and hence into said drum section and discharging such material into said outlet conduit for the material.

References Cited in the file of this patent

UNITED STATES PATENTS

| | | |
|---|---|---|
| 1,712,083 | Koppers | May 7, 1929 |
| 1,899,887 | Thiele | Feb. 28, 1933 |
| 2,420,376 | Johansson | May 13, 1947 |
| 2,441,386 | Berg | May 11, 1948 |
| 2,494,695 | Fisher | Jan. 17, 1950 |
| 2,592,783 | Aspegren | Apr. 15, 1952 |

FOREIGN PATENTS

| | | |
|---|---|---|
| 184,144 | Great Britain | Mar. 22, 1923 |
| 633,648 | Great Britain | Dec. 19, 1949 |

UNITED STATES PATENT OFFICE
CERTIFICATE OF CORRECTION

February 3, 1959

Patent No. 2,872,386

Olof Erik August Aspegren

It is hereby certified that error appears in the printed specification of the above numbered patent requiring correction and that the said Letters Patent should read as corrected below.

Column 4, line 4, after "wall" insert -- and --.

Signed and sealed this 2nd day of June 1959.

(SEAL)
Attest:

KARL H. AXLINE
Attesting Officer

ROBERT C. WATSON
Commissioner of Patents